United States Patent
Giles et al.

(10) Patent No.: US 10,106,164 B2
(45) Date of Patent: Oct. 23, 2018

(54) METHOD FOR A SYNCHRONOUS RANGE SHIFT ON AN ELECTRONICALLY CONTROLLED TWO-SPEED TRANSFER CASE WITH AN ELECTRONICALLY CONTROLLED ENGINE AND TRANSMISSION

(71) Applicant: GM Global Technology Operations LLC, Detroit, MI (US)

(72) Inventors: Peter J. Giles, Ypsilanti, MI (US); Shaun D. Hoffman, West Bloomfield, MI (US); Anthony Capobianco, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 282 days.

(21) Appl. No.: 15/251,657

(22) Filed: Aug. 30, 2016

(65) Prior Publication Data
US 2018/0057005 A1 Mar. 1, 2018

(51) Int. Cl.
| | |
|---|---|
| *B60W 10/06* | (2006.01) |
| *B60W 10/11* | (2012.01) |
| *B60W 10/14* | (2012.01) |
| *B60W 30/188* | (2012.01) |
| *B60K 17/346* | (2006.01) |
| *B60K 23/08* | (2006.01) |

(Continued)

(52) U.S. Cl.
CPC ....... *B60W 30/188* (2013.01); *B60K 17/3467* (2013.01); *B60K 23/08* (2013.01); *B60W 10/06* (2013.01); *B60W 10/11* (2013.01); *B60W 10/14* (2013.01); *B60W 50/14* (2013.01); *F16H 3/46* (2013.01); *F16H 61/0213* (2013.01); *F16H 61/0437* (2013.01); *B60W 2510/1005* (2013.01); *B60W 2520/10* (2013.01); *B60W 2710/0644* (2013.01); *B60W 2710/0666* (2013.01); *B60W 2710/1005* (2013.01); *B60W 2710/1038* (2013.01); *F16H 2200/0017* (2013.01); *F16H 2200/0034* (2013.01); *F16H 2200/2005* (2013.01)

(58) Field of Classification Search
CPC ...... B60W 10/06; B60W 10/11; B60W 10/14; B60W 30/188; B60K 23/0808
See application file for complete search history.

(56) References Cited

U.S. PATENT DOCUMENTS

| | | |
|---|---|---|
| 5,105,902 A | 4/1992 | Wilson et al. |
| 5,522,777 A | 6/1996 | Baxter et al. |

(Continued)

*Primary Examiner* — Edwin A Young (57) ABSTRACT

A method for shifting between a low speed range and a high speed range for a two-speed transfer case in a four-wheel drive vehicle includes determining a target transmission gear ratio and a desired transfer case range based on the current vehicle speed and the initial transfer case range. The transmission is shifted to the target transmission gear ratio when it is determined that the vehicle speed is in an appropriate range. The transfer case input torque is reduced to a minimum value, and the transfer case is shifted to neutral. The method further includes adjusting the engine speed and transmission gear setting to control the transmission output shaft speed to a desired range. The transfer case is shifted from neutral to the desired transfer case range when the transmission output shaft speed is within the desired range of transmission output shaft speed.

11 Claims, 4 Drawing Sheets

(51) Int. Cl.
*B60W 50/14* (2012.01)
*F16H 3/46* (2006.01)
*F16H 61/02* (2006.01)
*F16H 61/04* (2006.01)

(56) References Cited

U.S. PATENT DOCUMENTS

| | | | | |
|---|---|---|---|---|
| 5,845,754 | A | * | 12/1998 | Weilant .................. F16D 23/06 192/53.35 |
| 6,251,045 | B1 | | 6/2001 | Oliveira et al. |
| 6,579,208 | B2 | | 6/2003 | Oliveira et al. |
| 9,002,602 | B2 | | 4/2015 | Giles et al. |
| 9,358,883 | B2 | | 6/2016 | Hanna et al. |
| 2004/0259684 | A1 | * | 12/2004 | Kresse .................. B60W 10/06 477/115 |
| 2008/0220934 | A1 | * | 9/2008 | Babcock ............... B60W 10/06 477/5 |

* cited by examiner

FIG. 1

| Transmission Gear | Transmission Gear Ratio | Transfer Case Low Ratio | Combined Gear Ratio (Low Range) | Transfer Case High Ratio | Combined Gear Ratio (High Range) |
|---|---|---|---|---|---|
| 1 | 4.62 | 2.72 | 12.57 | 1.00 | 4.62 |
| 2 | 3.04 | 2.72 | 8.27 | 1.00 | 3.04 |
| 3 | 2.07 | 2.72 | 5.63 | 1.00 | 2.07 |
| 4 | 1.66 | 2.72 | 4.52 | 1.00 | 1.66 |
| 5 | 1.26 | 2.72 | 3.43 | 1.00 | 1.26 |
| 6 | 1.00 | 2.72 | 2.72 | 1.00 | 1.00 |
| 7 | 0.85 | 2.72 | 2.31 | 1.00 | 0.85 |
| 8 | 0.66 | 2.72 | 1.80 | 1.00 | 0.66 |

FIG. 2

| Transmission Gear | | Transmission Gear | 1 | 2 | 3 | 4 | 5 | 6 | 7 | 8 |
|---|---|---|---|---|---|---|---|---|---|---|
| | | Combined Gear Ratio (High Range) | 4.62 | 3.04 | 2.07 | 1.66 | 1.26 | 1.00 | 0.85 | 0.66 |
| Transmission Gear | Combined Gear Ratio (Low Range) | | | | | | | | | |
| 1 | 12.57 | | 7.95 | 9.53 | 10.50 | 10.91 | 11.31 | 11.57 | 11.72 | 11.91 |
| 2 | 8.27 | | 3.65 | 5.23 | 6.20 | 6.61 | 7.01 | 7.27 | 7.42 | 7.61 |
| 3 | 5.63 | | 1.01 | 2.59 | 3.56 | 3.97 | 4.37 | 4.63 | 4.78 | 4.97 |
| 4 | 4.52 | | 0.10 | 1.48 | 2.45 | 2.86 | 3.26 | 3.52 | 3.67 | 3.86 |
| 5 | 3.43 | | 1.19 | 0.39 | 1.36 | 1.77 | 2.17 | 2.43 | 2.58 | 2.77 |
| 6 | 2.72 | | 1.90 | 0.32 | 0.65 | 1.06 | 1.46 | 1.72 | 1.87 | 2.06 |
| 7 | 2.31 | | 2.31 | 0.73 | 0.24 | 0.65 | 1.05 | 1.31 | 1.46 | 1.65 |
| 8 | 1.80 | | 2.82 | 1.24 | 0.27 | 0.14 | 0.54 | 0.80 | 0.95 | 1.14 |

FIG. 3

| Transmission Gear | Combined Gear Ratio (Low Range) | Transmission Gear | 1 | 2 | 3 | 4 | 5 | 6 | 7 | 8 |
|---|---|---|---|---|---|---|---|---|---|---|
| | | Combined Gear Ratio (High Range) | 4.62 | 3.04 | 2.07 | 1.66 | 1.26 | 1.00 | 0.85 | 0.66 |
| 1 | 12.57 | | 63.2 | 75.8 | 83.5 | 86.8 | 90.0 | 92.0 | 93.2 | 94.7 |
| 2 | 8.27 | | 44.1 | 63.2 | 75.0 | 79.9 | 84.8 | 87.9 | 89.7 | 92.0 |
| 3 | 5.63 | | 17.9 | 46.0 | 63.2 | 70.5 | 77.6 | 82.2 | 84.9 | 88.3 |
| 4 | 4.52 | | 2.3 | 32.7 | 54.2 | 63.2 | 72.1 | 77.9 | 81.2 | 85.4 |
| 5 | 3.43 | | 34.8 | 11.3 | 39.6 | 51.6 | 63.2 | 70.8 | 75.2 | 80.7 |
| 6 | 2.72 | | 69.9 | 11.8 | 23.9 | 39.0 | 53.7 | 63.2 | 68.8 | 75.7 |
| 7 | 2.31 | | 99.8 | 31.5 | 10.5 | 28.2 | 45.5 | 56.7 | 63.2 | 71.5 |
| 8 | 1.80 | | 157.4 | 69.3 | 15.3 | 7.5 | 29.8 | 44.3 | 52.7 | 63.2 |

METHOD FOR A SYNCHRONOUS RANGE SHIFT ON AN ELECTRONICALLY CONTROLLED TWO-SPEED TRANSFER CASE WITH AN ELECTRONICALLY CONTROLLED ENGINE AND TRANSMISSION

FIELD

The present invention generally relates to a method for synchronously shifting between a high range and a low range of a transfer case of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transfer case for a 4×4 vehicle typically is capable of operating in two different gear ratios, often referred to as a high range and a low range. In general, shifting between the high range and the low range requires that the vehicle be stopped and that the vehicle transmission be shifted into neutral. Stopping the vehicle increases the chances of the vehicle getting stuck. Making a 4×4 range shift while the vehicle is moving can also help avoid a significant driveline torque disturbance when shifting the transfer case from neutral to high range or from neutral to low range caused by excessive transmission output shaft drag torque.

While systems for range shifting a transfer case are known in the art and achieve their intended purpose there still remains a need for improved systems and methods. More specifically, there is a need for a new and improved system allowing transfer case range shifting while the vehicle is moving while minimizing a change in propulsion, tractive effort, and/or driveline disturbance to the vehicle operator.

SUMMARY

A method is provided for shifting a two-speed transfer case between a low speed range and a high speed range in a four-wheel drive vehicle. The method includes determining a desired transfer case range based on the initial transfer case range, and a target transmission gear ratio based on the current vehicle speed and the initial transfer case range. The method further includes determining if the vehicle speed is in an appropriate vehicle speed range, and shifting the transmission to the target transmission gear ratio when it is determined that the vehicle speed is in the appropriate vehicle speed range. The method then reduces the transfer case input torque to a minimum value, and shifts the transfer case to neutral once the input torque to the transfer case is minimized. The method further includes determining a desired range of transmission output shaft speed, and adjusting the engine speed and transmission gear setting to control the transmission output shaft speed. According to the method, the transfer case is shifted from neutral to the desired transfer case range when the transmission output shaft speed is within the desired range of transmission output shaft speed.

In an embodiment of the present invention, the step of reducing the transfer case input torque to a minimum value includes minimizing engine output torque.

In another embodiment of the present invention, the step of reducing the transfer case input torque includes shifting the transmission to a neutral state.

In an embodiment of the present invention, the step of reducing the transfer case input torque comprises reducing hydraulic line pressure to zero to minimize the transmission output shaft drag torque.

In an aspect of the present invention, the transfer case contains a planetary gear set including a sun gear and a planetary carrier. The transfer case output shaft speed is equal to the sun gear speed when the transfer case is in the high speed range, and the transfer case output shaft speed is equal to the planetary carrier speed when the transfer case is in the low speed range.

In another aspect of the present invention, the transmission output shaft speed is measured by a transmission output shaft speed sensor.

In still another aspect of the present invention, the transfer case output shaft speed is measured by a transfer case output shaft speed sensor.

In yet another aspect of the present invention, the transfer case output shaft speed is calculated based on a measurement from a wheel speed sensor.

In another aspect of the present invention, the method further includes indicating to an operator of the vehicle that the vehicle speed needs to be increased or decreased to the appropriate vehicle speed range.

BRIEF DESCRIPTION OF THE DRAWINGS

The present invention will become more fully understood from the detailed description and the accompanying drawings, wherein.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
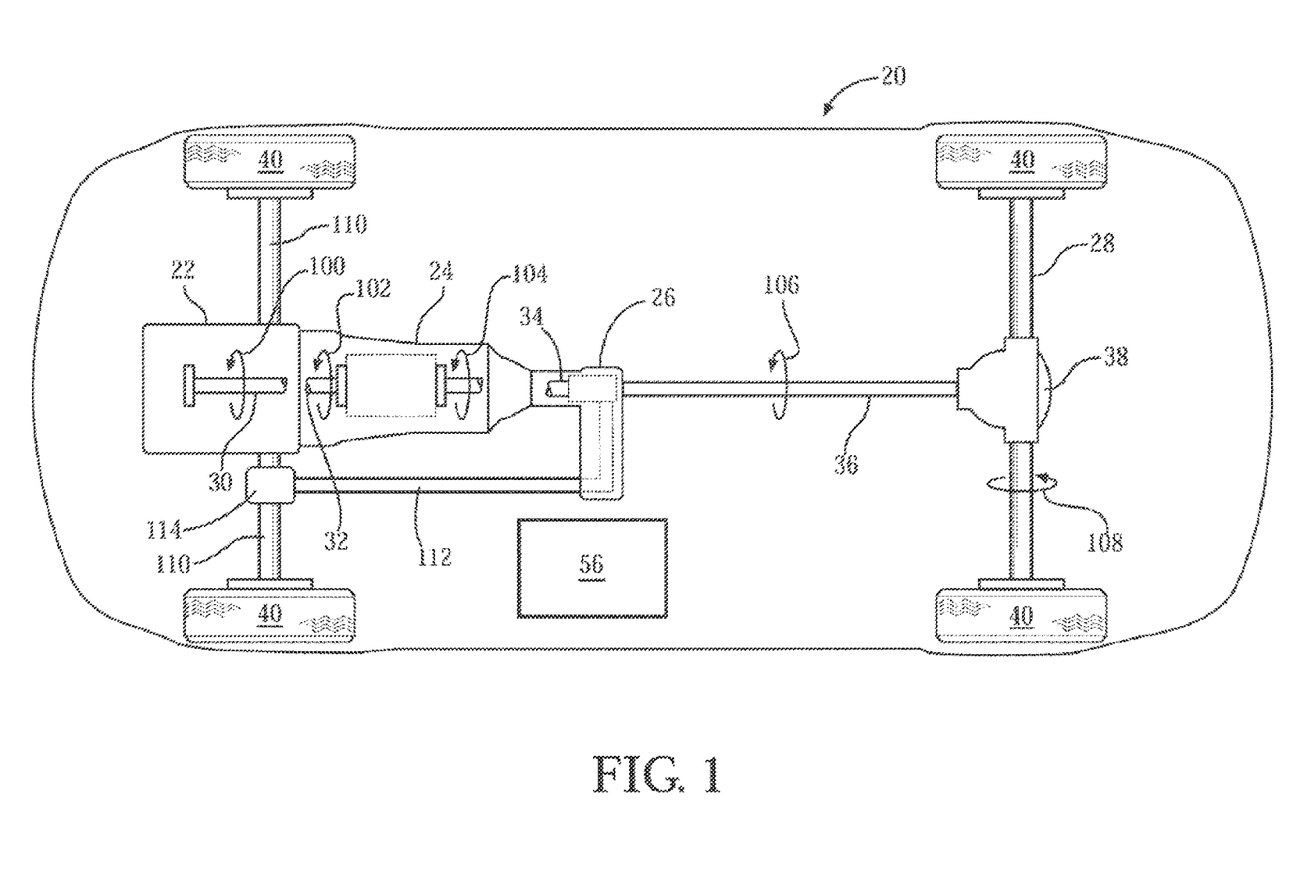
FIG. 1 is a schematic plan view of a vehicle, in accordance with the present invention.

Referring to the Figures, wherein like numerals indicate like parts throughout the several views, a vehicle is schematically shown at 20 in FIG. 1. Referring to FIG. 1, the vehicle 20 includes an engine 22, a transmission 24, a transfer case 26, a rear axle 28, and a front axle 110. The engine 22 may include any style, size and/or configuration of engine 22 suitable for a vehicle 20, including but not limited to a gasoline engine or a diesel engine. The engine 22 produces a drive torque, which is output through a crankshaft 30.

The transmission 24 is coupled to the engine 22, and includes a plurality of different gear ratios. For example, the transmission 24 may include four, five, six, eight, nine, ten, or more different gear ratios. A transmission input shaft 32 is coupled to the crankshaft 30, and receives the drive torque from the engine 22. A transmission output shaft 34 is coupled to the transmission input shaft 32 via a gear set (not shown), which defines the plurality of different gear ratios. The transmission output shaft 34 transfers the drive torque to the transfer case 26, which is coupled to the transmission 24.

Typically, the transfer case 26 includes two different gear ranges, commonly referred to as a high range and a low range. The drive torque output from the transmission 24 is passed through one of the gear ratios of the transfer case 26. The transfer case 26 includes a first transfer case output shaft 36, which couples the transfer case 26 and the rear axle 28, and transmits the drive torque from the transfer case 26 to the rear axle 28. The rear axle 28 includes a differential 38 having a gear set (not shown) that defines a rear axle gear ratio, through which the drive torque is passed. The rear axle 28 transfers the drive torque to at least one drive wheel 40, which is attached to the rear axle 28, to drive the vehicle 20. The transfer case 26 includes a second transfer case output shaft 112, which couples the transfer case 26 and the front axle 110, and transmits the drive torque from the transfer case 26 to the front axle 110. The front axle 110 includes a differential 114 having a gear set (not shown) that defines a front axle gear ratio, through which the drive torque is passed. The front axle 110 transfers the drive torque to at least one drive wheel 40, which is attached to the front axle 110, to drive the vehicle 20.

The vehicle 20 further includes a control module 56. The control module 56 may include a computer and/or processor, and all software, hardware, memory, algorithms, connections, sensors, etc., necessary to manage and control the operation of the drivetrain components including the engine 22, the transmission 24, and the transfer case 26. As such, a method, described below, may be embodied as a program operable on the control module 56. It should be appreciated that the control module 56 may include any device capable of analyzing data from various sensors, comparing data, making the necessary decisions required to determine which gear ratio the transmission 24 and the transfer case 26 are operating in, and executing the required tasks necessary to perform the described method. These tasks may include but are not limited to controlling the speed of the engine 22, controlling the torque produced by the engine 22, controlling whether the transmission 24 is in a neutral state in which the transmission input shaft 32 is decoupled from the transmission output shaft 34, controlling the gear ratio the transmission 24 is operating in, controlling whether the transfer case is in a neutral state in which the transmission output shaft 34 is decoupled from the transfer case output shaft 36, and controlling the gear ratio the transfer case 26 is operating in.

Figure 2:
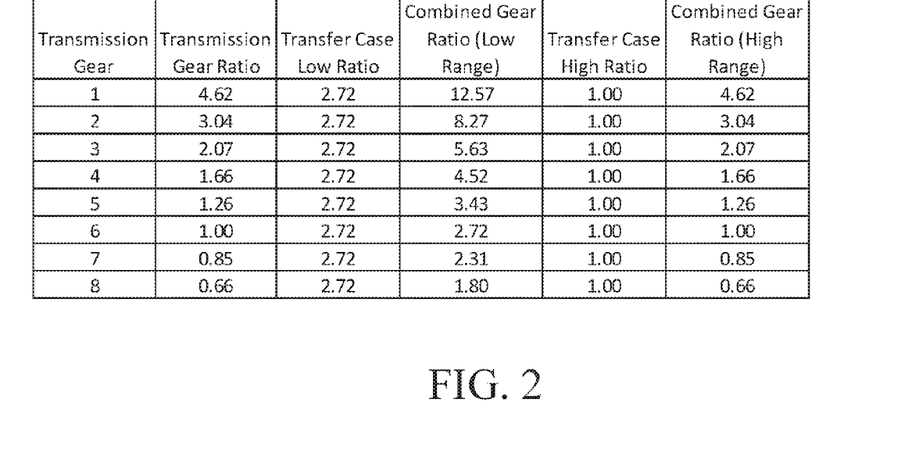
FIG. 2 is a table of exemplary gear ratios, according to the present invention.

By way of non-limiting example, a vehicle may be equipped with a transmission 24 which is an eight-speed transmission and a transfer case 26 which is a two-speed transfer case having the gear ratios listed in the table in FIG. 2. For the exemplary vehicle configuration depicted in FIG. 2, the transmission has the following gear ratios: first gear 4.62:1; second gear 3.04:1; third gear 2.07:1; fourth gear 1.66:1; fifth gear 1.26:1; sixth gear 1.00:1; seventh gear 0.85:1; and eighth gear 0.66:1. The exemplary vehicle configuration represented in FIG. 2 has a two-speed transfer case having a gear ratio of 2.72:1 in the low range, and a gear ratio of 1.00:1 in the high range.

The different gear ratios of the transmission 24, the transfer case 26, and the rear axle 28 combine to define a predetermined number of discrete combined gear ratios. A combined gear ratio may be calculated as the transmission gear ratio multiplied by the transfer case gear ratio. The combined gear ratio may be defined as an input speed divided by an output speed. The combined gear ratios listed in the table of FIG. 2 represent the transmission input shaft speed 102 divided by the transfer case output speed 106. An alternate definition of combined gear ratio may be considered in which the axle speed 108 is incorporated in the calculation. However, the axle speed 108 is related to the transfer case output speed 106 by the rear axle gear ratio, which is fixed. For convenience, the discussion that follows defines the combined gear ratio as the ratio of the transmission input shaft speed 102 to the transfer case output speed 106.

With continued reference to FIG. 2, the combined gear ratio with the transfer case in its low setting ranges from a high value of 12.57 with the transmission in first gear to a low value of 1.80 with the transmission in eighth gear. With the transfer case in its high setting, the combined gear ratio ranges from a high value of 4.62 with the transmission in first gear to a low value of 0.66 with the transmission in eighth gear.

Figure 3:
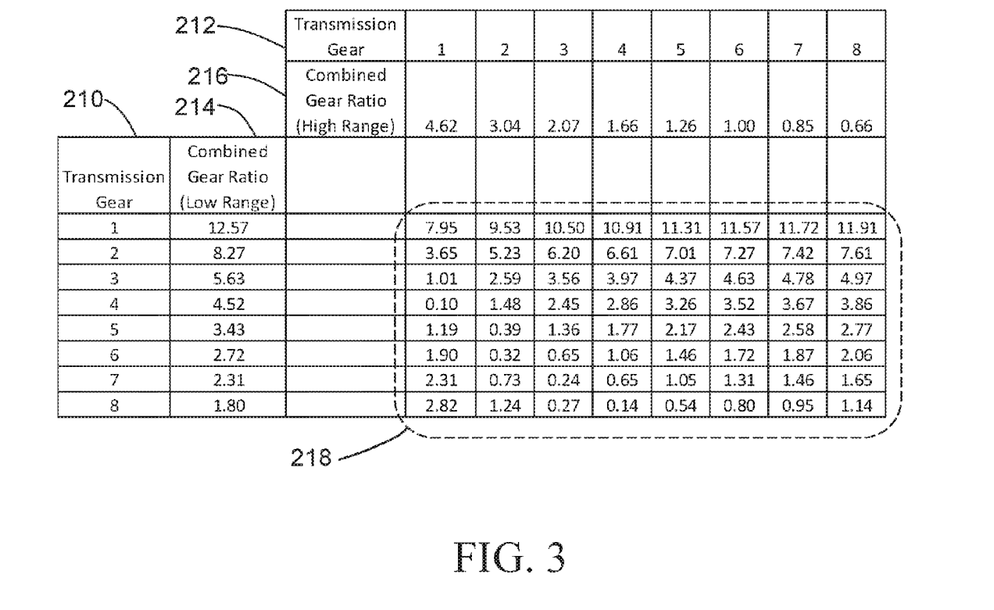
FIG. 3 is a table comparing exemplary combined gear ratios with the transfer case in its low range and with the transfer case in its high range, in accordance with the present invention.

FIG. 2 presents eight distinct combined gear ratios for the condition where the transfer case is in its low range, and eight distinct combined gear ratios for the condition where the transfer case is in its high range. Each of the eight low-range combined ratios can be compared to each of the eight high-range combined ratios, resulting in sixty-four possible comparisons. FIG. 3 is a table which enumerates the absolute value of the ratio difference for each of the sixty-four comparisons. In FIG. 3, the column 210 and the row 212 list the eight possible transmission gear settings, i.e. first through eighth gears. The column 214 lists the combined gear ratio for each of the transmission gear settings in the adjacent cell in column 210 with the transfer case in its low range. It will be noted that the numbers in column 214 are the same as the numbers in the fourth column of FIG. 2. The row 216 in FIG. 3 lists the combined gear ratio for each of the transmission gear settings in the adjacent cell in row 212 with the transfer case in its high range. It will be noted that the numbers in row 216 are the same as the numbers in the sixth column of FIG. 2.

With continued reference to FIG. 3, the number in each cell in region 218 of the table represents the absolute value of the algebraic difference between the combined gear ratio listed in column 214 on the same row as the particular cell in question and the combined gear ratio listed in row 216 in the same column as the particular cell in question. For example, the upper left cell in region 218 of FIG. 3 has a value of 7.95, which is calculated as the absolute value of (12.57-4.62); where 12.57 is the combined gear ratio listed in column 214 in the same row as the upper left cell of region 218, and 4.62 is the combined gear ratio listed in row 216 in the same column as the upper left cell of region 218. The numbers in the remained of region 218 are calculated in the same way.

Figure 4:
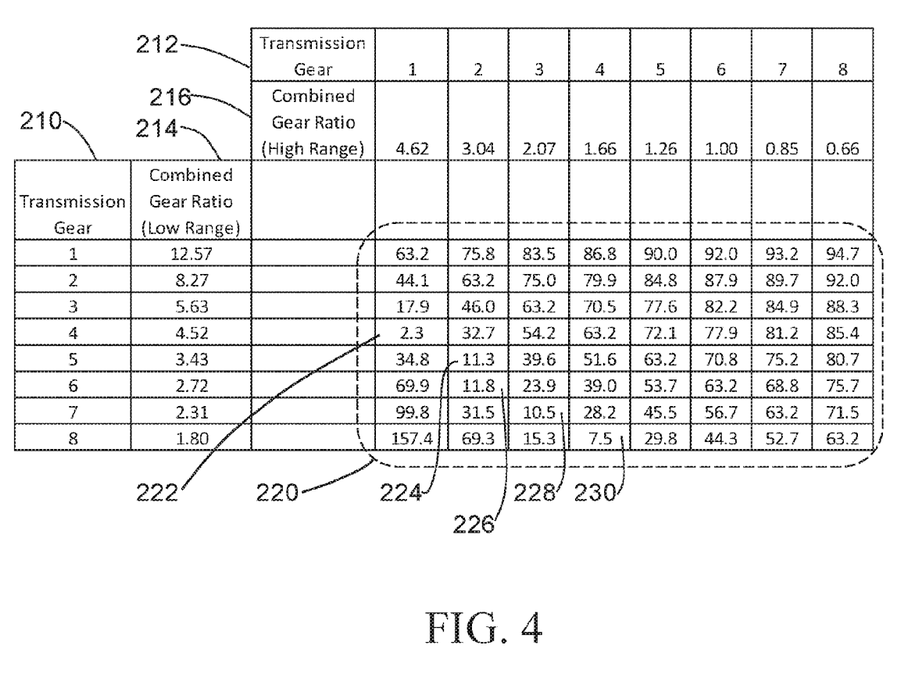
FIG. 4 is a table showing exemplary percentage difference between pairs of combined gear ratios in accordance with the present invention.

FIG. 4 depicts a table in which each of the entries in region 220 corresponds to the difference in combined gear ratios, similar to the table in FIG. 3 except that each difference is expressed as a percentage of the low-range combined gear ratio in column 214. For example, the upper left cell in region 220 of FIG. 4 has a value of 63.2, which is calculated as 100% times the absolute value of (12.57-4.62)/12.57; where 12.57 is the combined gear ratio listed in column 214 in the same row as the upper left cell of region 220, and 4.62 is the combined gear ratio listed in row 216 in the same column as the upper left cell of region 220. The numbers in the remainder of region 220 are calculated in the same way.

The number in each of the cells listed in region 220 of FIG. 4 approximates the percentage change in transmission input shaft speed 102 required to maintain the same transfer case output speed 106 as the transmission and transfer case are shifted between the transmission gear listed in the same row of column 210 as the cell in question with the transfer case in its low range and the transmission gear listed in the same column of row 212 as the cell in question with the transfer case in its high range. Cells in region 220 of FIG. 4 that have relatively small number can be used to identify operating regions where transfer case range shifting may be performed with relatively small change in propulsion, tractive effort, and/or driveline disturbance to the vehicle operator. The following examples illustrate the results in FIG. 4.

EXAMPLE 1

A vehicle having the exemplary gear ratios shown in FIG. 2 is operating with the transmission in fourth gear and the transfer case in its low range, with a transmission input shaft speed 102 of 2500 rpm. From column 214 of FIG. 3 or FIG. 4, the combined gear ratio from transmission input shaft speed 102 to transfer case output speed 106 is 4.52. The transfer case output speed 106 is given by (transmission input shaft speed 102) divided by (combined gear ratio), which equals 2500/4.52, or 553 rpm. The same transfer case output speed 106 of 553 rpm can be achieved with the transfer case in its high range with the transmission in first gear (combined gear ratio=4.62 from row 216 of FIG. 3 or FIG. 4) with a transmission input shaft speed 102 equal to 2555 rpm (2555/4.62=553). The ratio of transmission input shaft speeds 102 that yield the same transfer case output speed 106 can be calculated as 2555/2500, or 1.022. In other words, the vehicle can be shifted from fourth gear with the transfer case in its low range to first gear with the transfer case in its high range, maintaining the same transfer case output speed 106, by providing a 2.2 percent increase in transmission input shaft speed 102. The range shift in example 1 corresponds to the cell labeled 222 in FIG. 4.

EXAMPLE 2

A vehicle having the exemplary gear ratios shown in FIG. 2 is operating with the transmission in second gear and the transfer case in its high range, with a transmission input shaft speed 102 of 2500 rpm. From row 216 of FIG. 3 or FIG. 4, the combined gear ratio from transmission input shaft speed 102 to transfer case output speed 106 is 3.04. The transfer case output speed 106 is given by (transmission input shaft speed 102) divided by (combined gear ratio), which equals 2500/3.04, or 822 rpm. The same transfer case output speed 106 of 822 rpm can be achieved with the transfer case in its low range with the transmission in fifth gear (combined gear ratio=3.43 from column 214 of FIG. 3 or FIG. 4) with a transmission input shaft speed 102 equal to 2819 rpm (2819/3.43=822). The ratio of transmission input shaft speeds 102 that yield the same transfer case output speed 106 can be calculated as 2819/2500, or 1.12. In other words, the vehicle can be shifted from second gear with the transfer case in its high range to fifth gear with the transfer case in its low range, while maintaining the same transfer case output speed 106, by providing a 12 percent increase in transmission input shaft speed 102. The range shift in Example 2 corresponds to the cell labeled 224 in FIG. 4.

EXAMPLE 3

In this example the same initial conditions as presented in Example 2 above will be used. A vehicle having the exemplary gear ratios shown in FIG. 2 is operating with the transmission in second gear and the transfer case in its high range, with a transmission input shaft speed 102 of 2500 rpm. From row 216 of FIG. 3 or FIG. 4, the combined gear ratio from transmission input shaft speed 102 to transfer case output speed 106 is 3.04. The transfer case output speed 106 is given by (transmission input shaft speed 102) divided by (combined gear ratio), which equals 2500/3.04, or 822 rpm. In this example, the same transfer case output speed 106 of 822 rpm can be achieved with the transfer case in its low range with the transmission in sixth gear (combined gear ratio=2.72 from column 214 of FIG. 3 or FIG. 4) with a transmission input shaft speed 102 equal to 2819 rpm (2235/2.72=822). The ratio of transmission input shaft speeds 102 that yield the same transfer case output speed 106 can be calculated as 2235/2500, or 0.89. In other words, the vehicle can be shifted from second gear with the transfer case in its high range to fifth gear with the transfer case in its low range, while maintaining the same transfer case output speed 106, by providing an 11 percent reduction in transmission input shaft speed 102. The range shift in Example 3 corresponds to the cell labeled 226 in FIG. 4.

As used herein, the term "synchronous" as applied to a transfer case range shift refers to a range shift in which the transmission input shaft speed 102 and the transmission 24 are controlled such that the transfer case output speed 106 is substantially the same after the transfer case range is shifted as it was before the transfer case range was shifted. Calculations like those used to populate the table in FIG. 4 may be used to identify operating conditions that are favorable for achieving a synchronous transfer case range shift. In a non-limiting example, a predetermined threshold may be established, for example at a level of 15 percent. From FIG. 4, it can be seen that with the transfer case in the high range, values less than 15 percent occur with the transmission in first gear (cell 222), second gear (cells 224 and 226), third gear (cell 228), and fourth gear (cell 230). Accordingly, with the transfer case in its high range and the transmission in first, second, third, or fourth gear, a high-to-low transfer case range shift that maintains the same transfer case output speed 106 is possible with a transmission input shaft speed 102 change less than or equal to approximately 15 percent by appropriate selection of transmission gear ratio when the transfer case is shifted to its low range.

Similarly, with the transfer case in the low range, FIG. 4 shows that values less than 15 percent occur with the transmission in fourth gear (cell 222), fifth gear (cell 224), sixth gear (cell 226), seventh gear (cell 228), and eight gear (cell 230). Accordingly, with the transfer case in its low range and the transmission in fourth, fifth, sixth, seventh, or eight gear, a low-to-high transfer case range shift that maintains the same transfer case output speed 106 is possible with a transmission input shaft speed 102 change less than or equal to approximately 15 percent by appropriate selection of transmission gear ratio when the transfer case is shifted to its high range, given the exemplary gear ratios enumerated in the table of FIG. 2.

Figure 5:
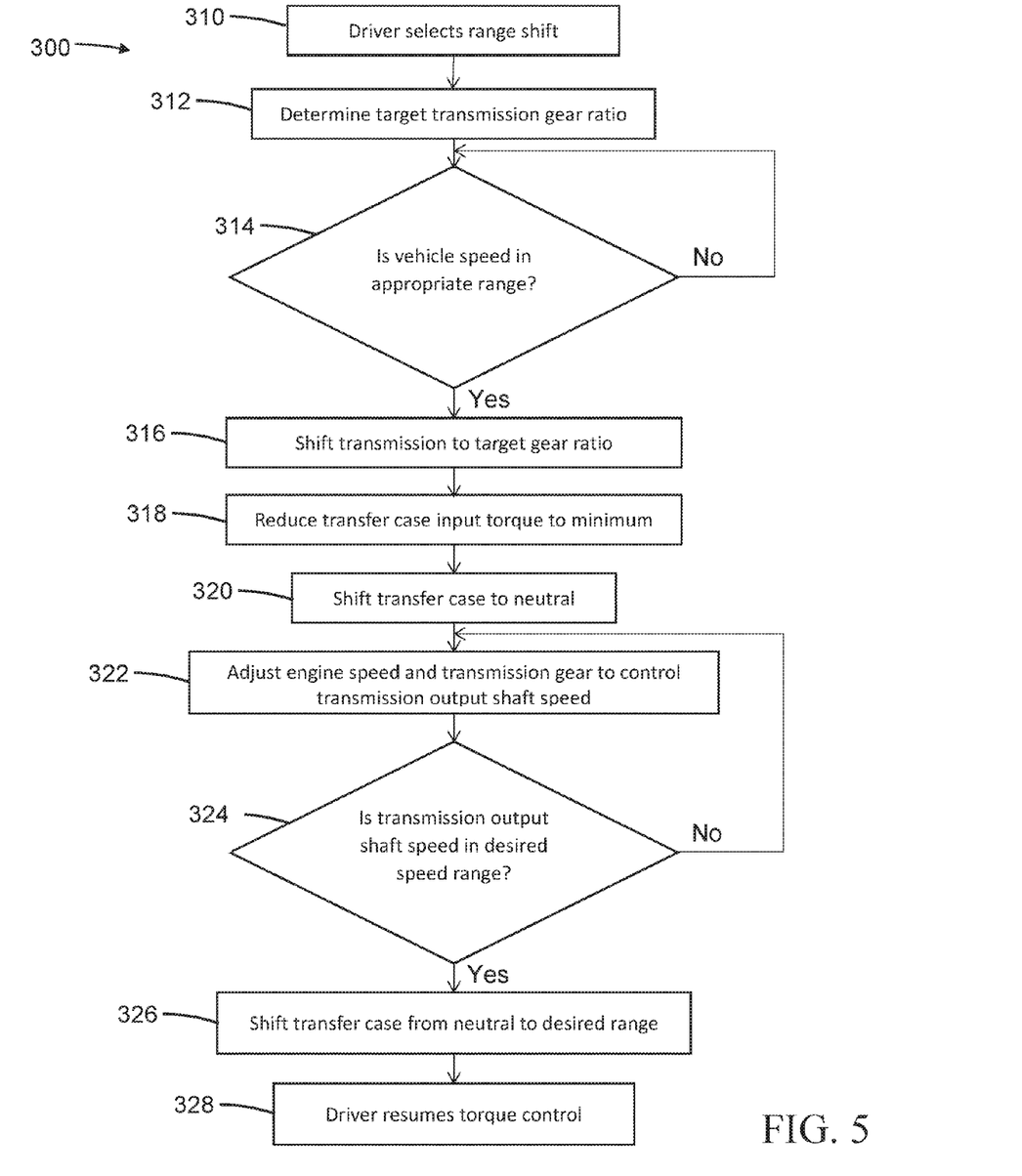
FIG. 5 is a flow chart showing steps of an exemplary method for achieving a synchronous range shift of a transfer case, in accordance with the present invention.

A flow chart depicting an exemplary method 300 for synchronous transfer case range shift is presented in FIG. 5. With reference to FIG. 5, in step 310 the driver of the vehicle indicates that a transfer case range shift is desired. The desired range shift may be either a shift from low range to high range, or a shift from high range to low range.

Upon recognizing that a range shift is desired, the method moves to step 312 where a target transmission gear ratio is determined. The target transmission gear ratio is determined such that the product of the target transmission gear ratio times the initial (current) transfer case gear ratio is within a predetermined percentage of an available new combined gear ratio, i.e. the product of an available new transmission gear ratio times the transfer case gear ratio in the desired transfer case range, the desired transfer case range being the range that is not the initial transfer case range. The available new transmission gear ratio used to determine the target transmission gear ratio will be referred to as the desired new gear ratio in the discussion of step 322 below.

The method may require that the vehicle be operating in an appropriate speed range before the transfer case range shift is allowed to occur. For example, a minimum vehicle speed may be required in order to achieve the appropriate target transmission gear ratio before shifting out of low range. Similarly, it may be necessary to limit the vehicle to a maximum vehicle speed in order to achieve the appropriate target transmission gear ratio before shifting out of high range. In step 314, the vehicle speed is monitored to ensure it is appropriate before proceeding with the method. It may be desirable to provide an indication to the vehicle operator to adjust the vehicle speed higher or lower to achieve the appropriate speed range to allow the transfer case range shift to occur.

Once it has been determined that the vehicle speed is in an appropriate range, the controller 56 shifts the transmission 24 to the target gear ratio in step 316. In step 318, the transfer case input torque is temporarily reduced to a minimum. Actions to achieve transfer case input torque reduction may include controlling the engine 22 to minimize engine output torque, shifting the transmission 24 to neutral, and/or reducing hydraulic line pressure to zero to minimize the transmission output shaft drag torque.

After the input torque to the transfer case is minimized in step 318, the method proceeds to step 320. In step 320, the controller 56 shifts the transfer case 26 to neutral. The method then proceeds to step 322. In step 322, the controller 56 shifts the transmission to the gear setting that will produce the desired new gear ratio discussed above relative to method step 312. After shifting the transmission, the controller 56 controls the engine 22 to control the transmission output shaft speed 104 to a desired speed range that will produce a transfer case output speed 106 within a predetermined range of what the transfer case output speed 106 was prior to shifting the transfer case 26 to neutral in step 320. A torque converter having a torque converter clutch may be provided in the transmission 24. The torque converter clutch may be commanded to be locked to facilitate better control of the transmission output shaft speed 104. Alternatively, the torque converter clutch may be unlocked to potentially allow a wider speed range where synchronous range shifts could be performed. The transmission output shaft speed 104 is monitored in step 324 until it is in its desired range, at which time the method proceeds to step 326, where the controller 56 shifts the transfer case from neutral to the desired transfer case range. The method then proceeds to step 328 in which the driver resumes normal control of vehicle propulsion torque to the front and rear axles via the vehicle accelerator pedal.

The foregoing description focuses on a vehicle with a transmission having a finite number of distinct gear ratios. It will be appreciated that the method described herein can be applied to other forms of transmission, including but not limited to continuously variable transmission (CVT), electrically variable transmission (EVT), and dual clutch transmission (DCT), provided that the transmission speed ratio can be electronically controlled. While these other forms of transmission may not achieve speed conversion through gears having distinct ratios of gear teeth, it is customary to describe speed ratios of such transmissions in terms of effective gear ratio. As used herein, the term "gear ratio" when applied to a transmission refers to an effective gear ratio that corresponds to the speed ratio achieved by the transmission in the event that the speed conversion is not the result of the numbers of gear teeth in meshing gears.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, if used above, means that some or all code from multiple modules may be executed using a single (shared) processor. In addition, some or all code from multiple modules may be stored by a single (shared) memory. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A method for shifting a two-speed transfer case between a low speed range and a high speed range in a four-wheel drive vehicle having an electronically controlled engine and an electronically controlled transmission supplying torque to the transfer case, the transfer case comprising an output shaft, the transfer case operating in an initial transfer case range; the method comprising the steps of:
determining a desired transfer case range based on the initial transfer case range;
determining a target transmission gear ratio based on the current vehicle speed and the initial transfer case range;
determining if the vehicle speed is in an appropriate vehicle speed range, shifting the transmission to the target transmission gear ratio when it is determined that the vehicle speed is in the appropriate vehicle speed range;
reducing the transfer case input torque to a minimum value;
once the input torque to the transfer case is minimized, shifting the transfer case to neutral;
determining a desired range of transmission output shaft speed;
adjusting the engine speed and transmission gear ratio to control the transmission output shaft speed;
shifting the transfer case from neutral to the desired transfer case range when the transmission output shaft speed is within the desired range of transmission output shaft speed.

2. The method according to claim 1 wherein the step of reducing the transfer case input torque to a minimum value comprises minimizing engine output torque.

3. The method according to claim 1 wherein the step of reducing the transfer case input torque comprises shifting the transmission to a neutral state.

4. The method according to claim 1 wherein the step of reducing the transfer case input torque comprises reducing hydraulic line pressure to zero to minimize the transmission output shaft drag torque.

5. The method according to claim 1 wherein the transfer case comprises a planetary gear set comprising a sun gear and a planetary carrier, wherein the transfer case output shaft speed is equal to the sun gear speed when the transfer case is in the high speed range, and wherein the transfer case output shaft speed is equal to the planetary carrier speed when the transfer case is in the low speed range.

6. The method according to claim 1 wherein the transmission output shaft speed is measured by a transmission output shaft speed sensor.

7. The method according to claim 1 wherein the transfer case output shaft speed is measured by a transfer case output shaft speed sensor.

8. The method according to claim 1 wherein the transfer case output shaft speed is calculated based on a measurement from a wheel speed sensor.

9. The method according to claim 1 further comprising a step of indicating to an operator of the vehicle that the vehicle speed needs to be increased or decreased to the appropriate vehicle speed range.

10. A controller operable to shift a two-speed transfer case between a low speed range and a high speed range in a four-wheel drive vehicle having an electronically controlled engine and an electronically controlled transmission supplying torque to the transfer case, the transfer case comprising an output shaft, the transfer case operating in an initial transfer case range;
the controller comprising a processor and a non-transitory computer-readable medium containing instructions that, when executed, perform the method comprising the steps of:
determining a desired transfer case range based on the initial transfer case range;
determining a target transmission gear ratio based on the current vehicle speed and the initial transfer case range;
determining if the vehicle speed is in an appropriate vehicle speed range,
shifting the transmission to the target transmission gear ratio when it is determined that the vehicle speed is in the appropriate vehicle speed range;
reducing the transfer case input torque to a minimum value;
once the input torque to the transfer case is minimized, shifting the transfer case to neutral;
determining a desired range of transmission output shaft speed;
adjusting the engine speed and transmission gear ratio to control the transmission output shaft speed;
shifting the transfer case from neutral to the desired transfer case range when the transmission output shaft speed is within the desired range of transmission output shaft speed.

11. A system to control a two-speed transfer case between a low speed range and a high speed range in a four-wheel drive vehicle having an electronically controlled engine and an electronically controlled transmission supplying torque to the transfer case, the transfer case comprising an output shaft, the transfer case operating in an initial transfer case range;
the system comprising a controller configured to:
determine a desired transfer case range based on the initial transfer case range;
determine a target transmission gear ratio based on the current vehicle speed and the initial transfer case range;
determine if the vehicle speed is in an appropriate vehicle speed range,
shift the transmission to the target transmission gear ratio when it is determined that the vehicle speed is in the appropriate vehicle speed range;
reduce the transfer case input torque to a minimum value;
once the input torque to the transfer case is minimized, shift the transfer case to neutral;
determine a desired range of transmission output shaft speed;
adjust the engine speed and transmission gear ratio to control the transmission output shaft speed; and
shift the transfer case from neutral to the desired transfer case range when the transmission output shaft speed is within the desired range of transmission output shaft speed.

* * * * *